US008116241B2

(12) United States Patent
Shimizu et al.

(10) Patent No.: US 8,116,241 B2
(45) Date of Patent: Feb. 14, 2012

(54) WIRELESS COMMUNICATION SYSTEM AND TRANSMISSION DEVICE

(75) Inventors: Masahiko Shimizu, Kawasaki (JP); Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 11/128,285

(22) Filed: May 13, 2005

(65) Prior Publication Data
US 2006/0153098 A1  Jul. 13, 2006

(30) Foreign Application Priority Data
Jan. 13, 2005  (JP) ................................. 2005-006352

(51) Int. Cl.
 H04B 7/00   (2006.01)
 H04B 7/005  (2006.01)
 H04B 7/185  (2006.01)
 H04L 12/66  (2006.01)
 H04W 72/00  (2009.01)

(52) U.S. Cl. ..... 370/310; 370/278; 370/378; 455/452.1; 455/452.2; 455/13.3

(58) Field of Classification Search .................. 370/310, 370/278, 254; 455/452.1, 452.2, 13.3
See application file for complete search history.

(56) References Cited

U.S. PATENT DOCUMENTS

| 5,555,444    | A  * | 9/1996  | Diekelman et al. .......... 455/12.1 |
| 6,473,467    | B1 * | 10/2002 | Wallace et al. ............... 375/267 |
| 2002/0122383 | A1 * | 9/2002  | Wu et al. ...................... 370/210 |
| 2002/0191703 | A1   | 12/2002 | Ling |
| 2002/0193146 | A1 * | 12/2002 | Wallace et al. ............... 455/562 |
| 2003/0125040 | A1 * | 7/2003  | Walton et al. ................. 455/454 |
| 2003/0235147 | A1 * | 12/2003 | Walton et al. ................. 370/204 |
| 2004/0120280 | A1   | 6/2004  | Western ........................ 370/328 |
| 2004/0248618 | A1 * | 12/2004 | Yoshii et al. ............... 455/562.1 |
| 2005/0007947 | A1   | 1/2005  | Abe et al. ..................... 370/206 |
| 2005/0068909 | A1 * | 3/2005  | Chae et al. .................... 370/278 |
| 2005/0128983 | A1 * | 6/2005  | Kim et al. ..................... 370/334 |
| 2006/0258303 | A1   | 11/2006 | Taira |

FOREIGN PATENT DOCUMENTS

| JP | 2004-32712    |    | 1/2004  |
| JP | 2004-080110   |    | 3/2004  |
| WO | 2004095730    | A1 | 11/2004 |

OTHER PUBLICATIONS

"A Study on Multi-Transmit and Multi-Receive Adaptive Array Antenna Systems Using Delay Profile Feed Back Based Beamforming Scheme" by Yuji Hoshida, el al., Graduate School of Engineering, Osaka University; p. 504; with Eng. Translation, 2002.

(Continued)

*Primary Examiner* — Ariel Balaoing
(74) *Attorney, Agent, or Firm* — Murphy & King, P.C.

(57) ABSTRACT

The present invention relates to a wireless communication system to properly switch over a transmission method of radio signals corresponding to a configuration of a receiver. The wireless communication system according to the present invention includes a transmitting device having a plurality of antennas and capable of transmitting radio signals different from each other from these antennas, and a receiving device having at least one antenna and receiving the radio signals transmitted from the transmitting device. The receiving device comprises an information transmitting unit transmitting, to the transmitting device, configuration information about a configuration of the receiving device, and the transmitting device includes a transmitting unit transmitting the radio signals by a transmission method corresponding to the configuration information received from the receiving device.

6 Claims, 13 Drawing Sheets

OTHER PUBLICATIONS

Final Office Action dated Oct. 13, 2010 of corresponding U.S. Appl. No. 12/556,092.
Notice of Reason for Rejection received in corresponding Japanese Patent Application 2005-006352 dated Mar. 2, 2010.
Romain Rollet et al., IEEE 802.11-04/0914r1, Sep. 2004, pp. 1, 10, 11.
Non Final Office Action dated May 4, 2010 received in U.S. Appl. No. 12/556,092.
Non-Final Office Action dated Mar. 10, 2011 received in U.S. Appl. No. 12/556,092.

* cited by examiner

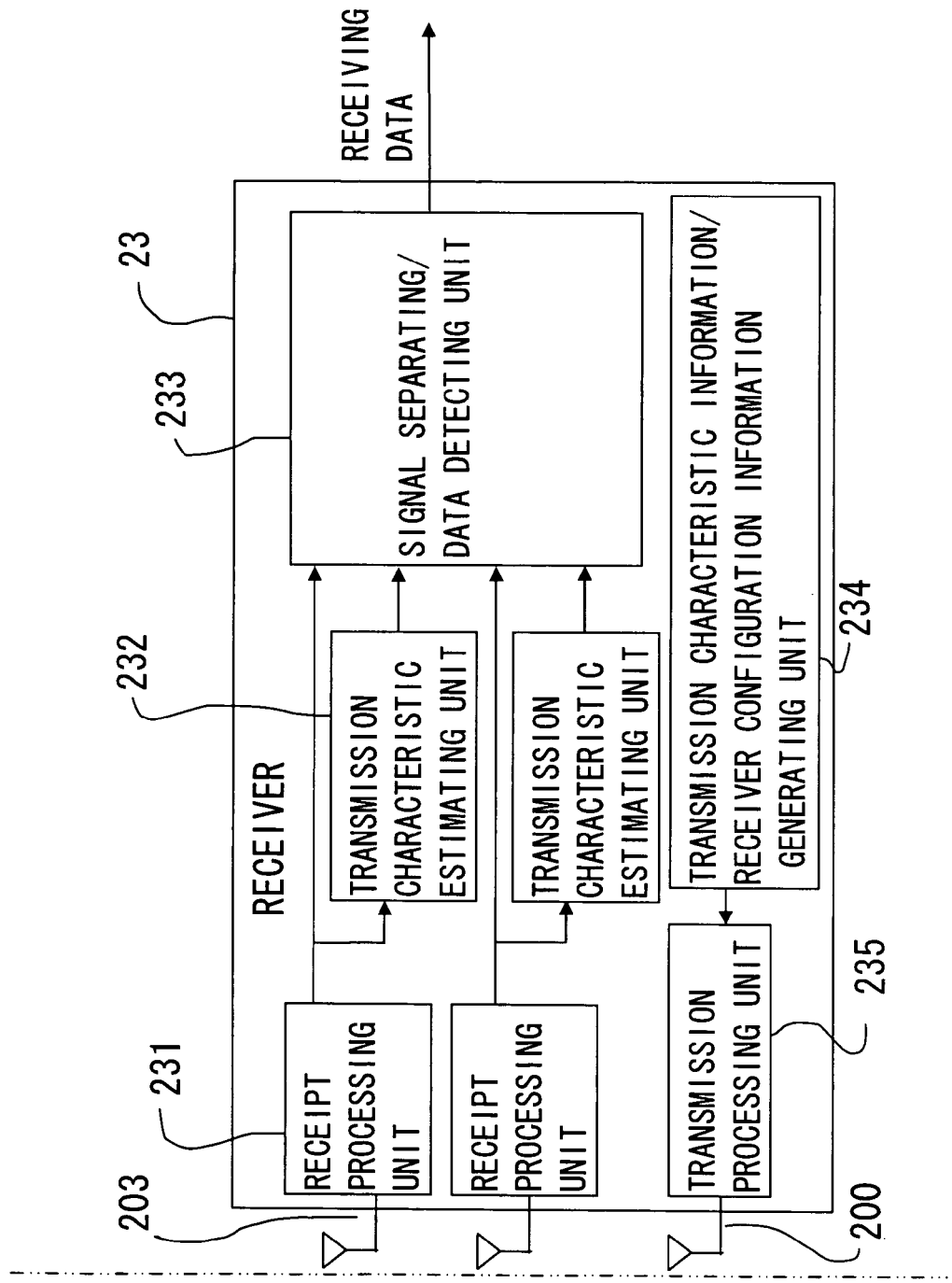

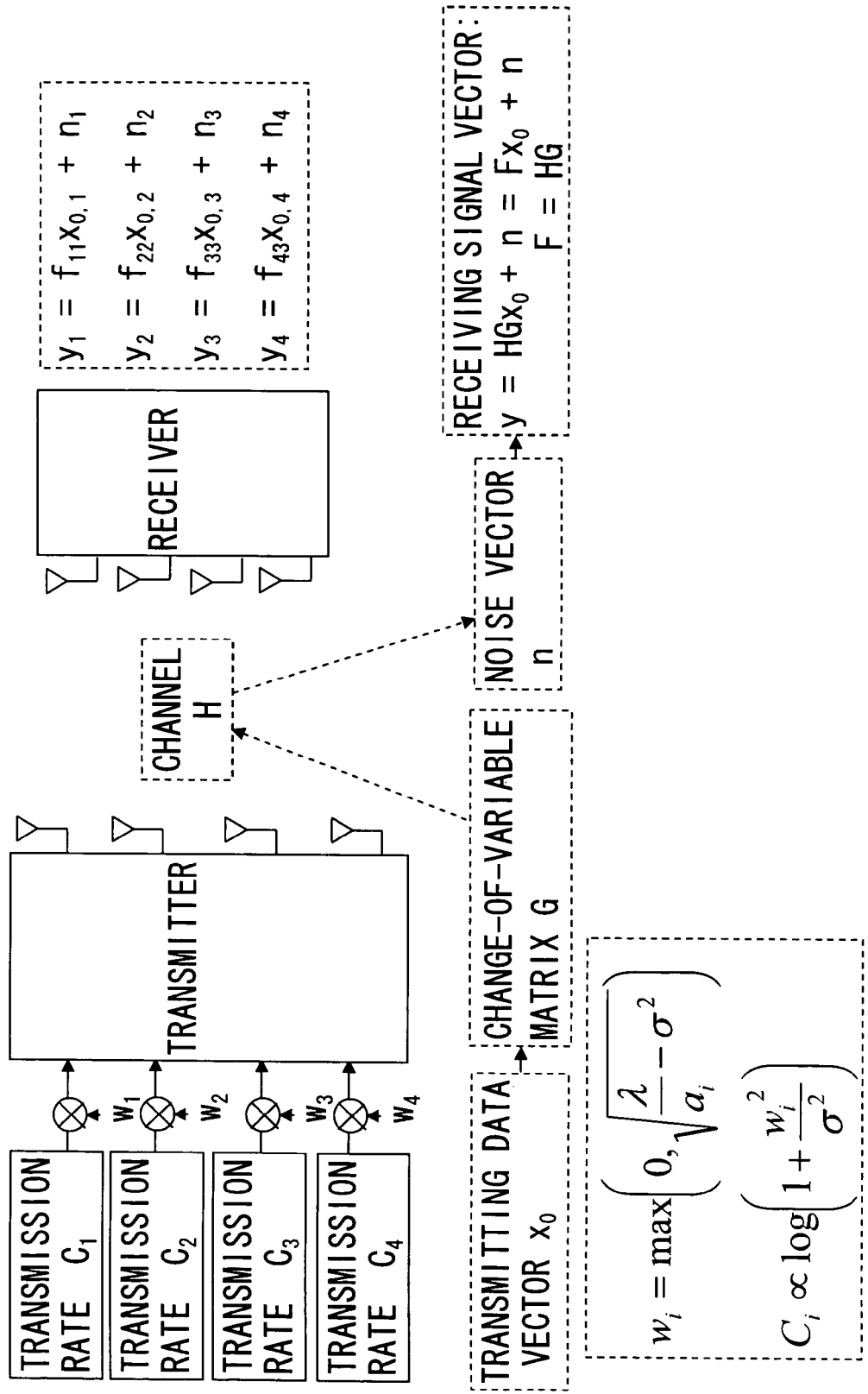

TRANSMISSION ENVIRONMENT
(DELAY PROFILE)

WIRELESS COMMUNICATION SYSTEM AND TRANSMISSION DEVICE

BACKGROUND OF THE INVENTION

1. Field of the Present Invention

The invention relates to a wireless communication system including a transmitting device having a plurality of antennas and capable of transmitting different radio signals from the respective antennas, and to the transmitting device.

2. Description of the Related Art

MIMO (Multi Input and Multi Output) communication system is given as a communication system capable of improving a transmission rate (transmission capacity) as a total by transmitting different pieces of data by use of same frequency band (and further the same spread code) from a plurality of antennas in parallel. The MIMO communication system is that plural pieces of data are transmitted from a plurality of transmitting antennas in parallel, and the signals synthesized while passing through a variety of communication paths are received by a plurality of receiving antennas. FIG. 7 is a diagram showing an outline of the MIMO communication system. FIG. 7 shows, in the MIMO communication system configured by i-pieces of transmitting antennas 500 and j-pieces of receiving antennas 510, how plural pieces of data ($x_1$-$x_i$) are transmitted to the receiving antennas 510 from the transmitting antennas 500, and the respective antennas obtain signals $y_1$-$y_j$ synthesized with these pieces of data ($x_1$-$x_i$).

Note that when the transmission signal from each antenna is designated by a transmission vector x, the receipt signal received by each antenna is designated by a receipt vector y, a state of a radio path is expressed as a channel matrix H, and a noise vector is designated by n, there is established a relationship such as $y=Hx+n$.

In the MIMO communications as shown in FIG. 7, a receiving-side device receiving the signals transmitted from the plurality of antennas and then synthesized, utilizes a method called MLD (Maximum Likelihood Detection) defined as a maximum likelihood decoding method in order to acquire an excellent radio characteristic. By this method, the receiving-side device detects a necessary piece of data by separating the synthesized signals. The MLD is a method of detecting a data pattern by judging, with respect to combinations of all the transmission data patterns that can be transmitted by the transmitting side, if transmitted in such a manner, how much a possibly-acquired receipt signal gets approximate to the actual receipt signal (a degree of maximum likelihood) (see FIG. 8). In the MLD, however, in the case of transmitting the signals from, for example, four pieces of transmitting antennas by 16 QAM (Quadrature Amplitude Modulation) defined as a digital modulation method of transmitting 4-bit data with one symbol, there is a necessity of obtaining the likelihood of data patterns numbered as tremendously as 65536 ($=16^4$). In this case, it follows that the receiving-side device detects the data pattern exhibiting the maximum likelihood from within this tremendous number of data patterns. Thus, the MIMO communication system requires an enormous throughput for the data detection.

A method for solving this problem involves employing Pre-Rake, etc. shown in FIG. 9(B) in the transmitting-side device. The method typified by Pre-Rake is a method for reducing the receiving-side processes by the signal processing on the transmitting side. For instance, FIG. 9 shows wireless communications based on normal CDMA (Code Division Multiple Access) (FIG. 9(A)) and CDMA-based wireless communications using Pre-Rake (FIG. 9(B)). In the normal CDMA-based wireless communications shown in FIG. 9(A), the receiving side detects the data by the signal processing (channel compensation) based on the transmission path information. On the other hand, in the case of employing Pre-Rake shown in FIG. 9(B), the signal processing is previously executed based on the transmission path information of the signal before transmitting the signals.

In the Pre-Rake method, for example, in the case of a transmission environment (an environment where a path 1 and a path 2 shown in FIG. 10(A) exit) as shown in FIG. 10(A), though normally the receiving side makes channel compensation corresponding to the transmission environment, the transmitting side executes a channel compensation process equivalent to that on the receiving side.

For instance, a weighting synthesis (Rake creating) unit as shown in FIG. 10(B) multiplies the transmission signal by a weighting coefficient of each transmission environment. With this operation, the receiving-side signal processing can be reduced.

A technology disclosed in the document ("Examinations about Configuration of Transmitter/Receiver of MTMT Array System Using Weight Batchwise Control at Base Station", written by Hoshida, B-5-54, General Meeting of Electronic Information Communication Institution in 2002) is proposed as a method of increasing a channel capacity by executing this type of signal processing employing the transmission path information on the transmitting side in the MIMO communication system.

That is, in the MIMO communication system, there are proposed a method of using an MLD receiver requiring an enormous throughput for acquiring an excellent radio characteristic and a method of employing a simple receiver requiring merely a low throughput by executing the signal processing that previously takes account of the transmission path on the transmitting side.

A base station performing the MIMO communications, however, has a case of desiring to separately use the MLD receiver and the simple receiver. In this case, there is none of a method of making the above methods coexistent with each other.

SUMMARY OF THE INVENTION

It is an object of the present invention to provide a wireless communication system capable of properly switching over a transmission method of a radio signal corresponding to a configuration of a receiver.

The present invention adopts the following configurations in order to solve the above-mentioned problems. Namely, the present invention is about a wireless communication system comprising a transmitting device having a plurality of antennas and capable of transmitting radio signals different from each other from the plurality of antennas, and a receiving device having at least one of antennas and receiving the radio signals transmitted from the transmitting device. In the present invention, the receiving device includes an information transmitting unit transmitting, to the transmitting device, configuration information about a configuration of the receiving device, and the transmitting device includes a transmitting unit transmitting the radio signals by a transmission method corresponding to the configuration information received from the receiving device.

In the present invention, the transmitting device is notified of the configuration information of the receiving device, and the transmitting device transmits the radio signals by a transmission method based on the notified configuration information.

Therefore, according to the present invention, the transmission method executed by the transmitting device can be changed corresponding to the configuration of the receiving device.

Further, in the present invention, the configuration information contains a piece of number-of-antenna information held by the receiving device, and the transmitting unit determines the transmission method on the basis of the number-of-antenna information contained in the configuration information.

Hence, according to the present invention, the transmission method executed by the transmitting device can be changed corresponding to the number-of-antenna information of the receiving device.

Moreover, in the present invention, the receiving device further includes an extraction unit extracting, from the received radio signals, transmission characteristic information containing transmission path information corresponding to an environment where the radio signals are transmitted, the information transmitting unit transmits the configuration information and the transmission characteristic information, the transmitting device further includes a detection unit detecting the transmission path information from the transmission characteristic information received from the receiving device, and a transforming unit transforming the transmission signals on the basis of the detected transmission path information and the number-of-antenna information contained in the configuration information, and the transmitting unit transmits the radio signals corresponding to the transformed transmission signals.

In the present invention, the receiving device notifies the transmitting device of the transmission characteristic information and the configuration information of the receiving device. Then, the transmitting device detects the transmission path information from the notified transmission characteristic information. Further, the transmitting device transforms the transmission signals based on the detected transmission path information and the number-of-antenna information of the receiving device so that the receiving device can receive only the radio signals corresponding to the number-of-antenna information, and transmits the transformed signals.

Therefore, according to the present invention, it is possible to determine the transmission method corresponding to the number-of-antenna information of the receiving device having none of a high-level demodulating function by taking account of both of the number-of-antenna information of the receiving device and the transmission path information.

Note the present invention may be a program for actualizing any one of the functions described above. Moreover, the present invention may also be a readable-by-computer storage medium stored with such a program.

According to the present invention, it is feasible to actualize the wireless communication system capable of properly switching over the transmission method corresponding to the configuration of the receiver.

BRIEF DESCRIPTION OF THE DRAWINGS

FIG. 4 is a diagram showing an example of executing weighting of a transmission data symbol and controlling a transmission rate in accordance with transmission path information;

DESCRIPTION OF THE PREFERRED EMBODIMENTS

An embodiment of a MIMO communication system according to the present invention will hereinafter be described with reference to the drawings. A configuration in the embodiment is an exemplification, and the present invention is not limited to the configuration in the embodiment.

<Device Configuration>

Figure 1:
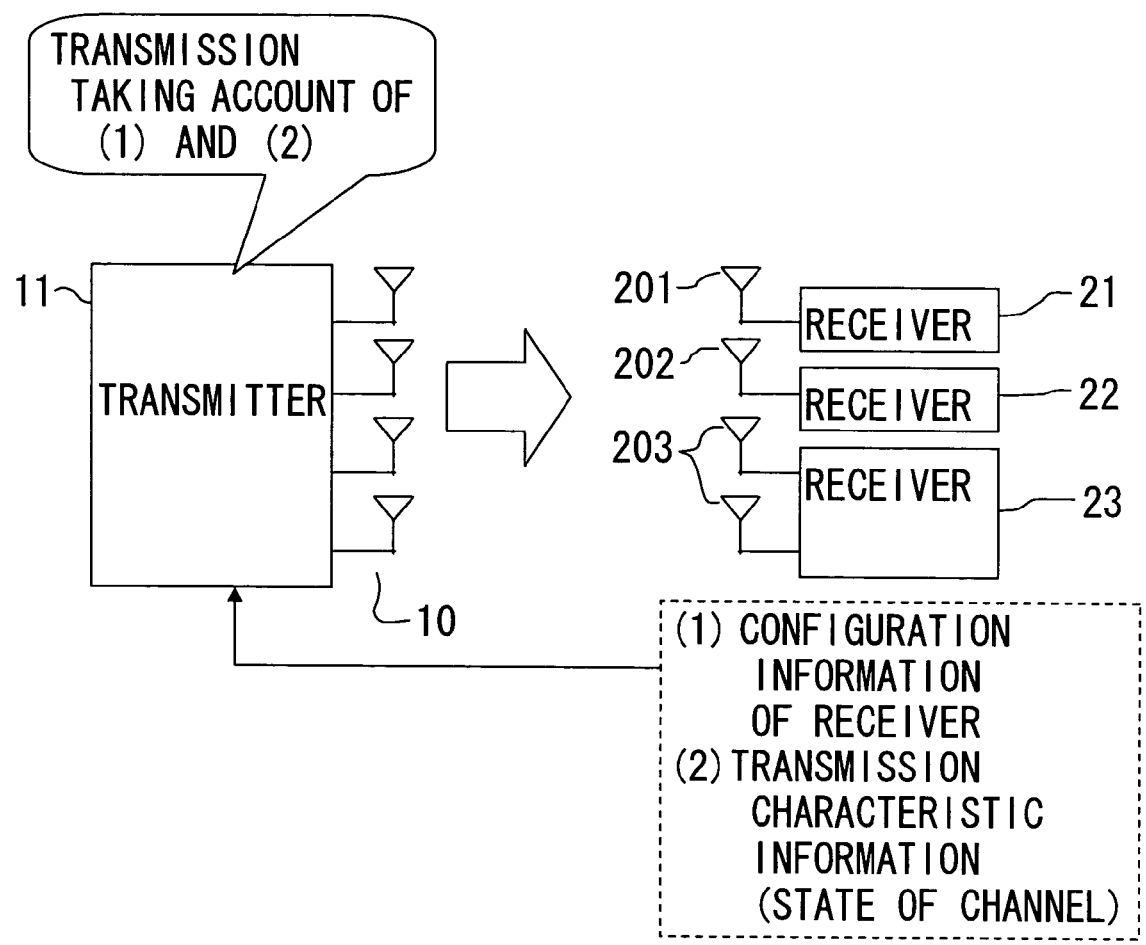
FIG. 1 is a diagram showing an architecture of a MIMO communication system in an embodiment.

FIG. 1 is a diagram showing an outline of a hardware (H/W) architecture in the embodiment of the MIMO communication system according to the present invention. The outline of the H/W architecture in the embodiment of the present invention will be explained with reference to FIG. 1.

The MIMO communication system in the embodiment is comprised of, by way of an example, a transmitter 11 and a plurality of receivers 21, 22, and 23. For instance, the transmitter 11 has four pieces of antenna elements 10, the receiver 21 has one antenna element 200, the receiver 22 has one antenna element 201, and the receiver 23 has two antenna elements 203, respectively.

Signals transmitted from the antenna elements 10 of the transmitter 11 are received by the respective antenna elements 201, 202 and 203, and data (carried on the signals) are detected by the respective receivers 21, 22, 23. Further, pieces of transmission characteristic information of the signals received by the respective antennas are individually specified by signal processing of the receivers 21, 22 and 23 ((2) shown in FIG. 1). Then, the transmission characteristic information and information about the configuration of the receiver ((1) shown in FIG. 1) are transmitted to the transmitter 11 by use of, e.g., dedicated antennas (unillustrated). As a matter of course, the illustrated antennas can be also employed. The transmission characteristic information is characteristic information of a transmission path along which the signal is transmitted from each of the transmission antennas 10 to each of the receiving antennas 200, 201, 202 and 203. The configuration information of the receiver can contain at least one item among items such as the number of receivers, the number of antenna elements possessed by each receiver, a demodulation method of each receiver, and performance (a processing speed, a degree of signal processability) of the receiver.

The transmitter 11 receiving the configuration information of the receiver and the transmission characteristic information, after effecting signal processing upon the signals on the basis of these items of information, transmits these signals to the receivers 21, 22 and 23. Note that for an easy understanding of the description in the embodiment, only unidirectional wireless communications are illustrated in separation into the transmitter and the receivers, however, each device may have both of the receiving function and the transmitting function, whereby bidirectional communications may be performed.

Figure 2:
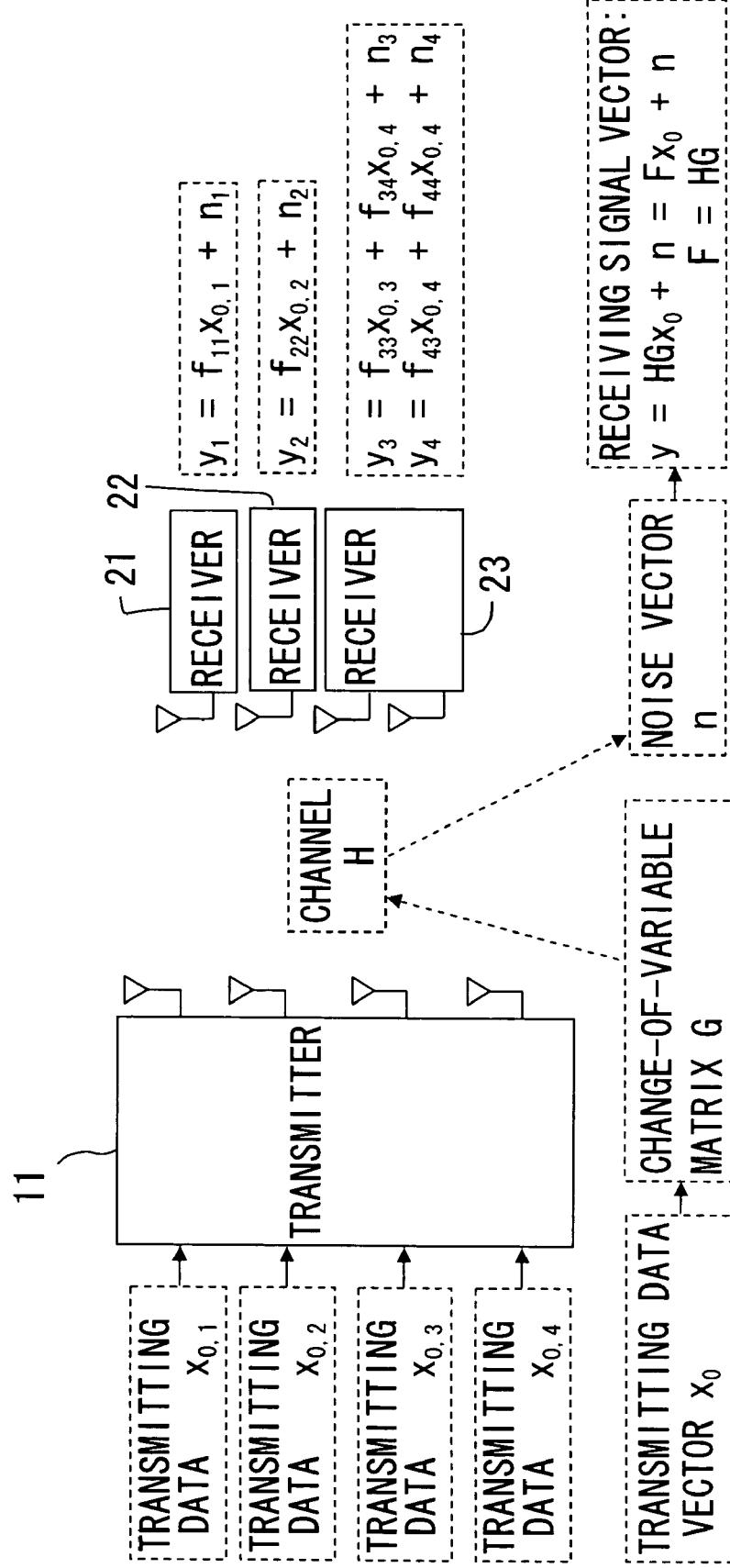
FIG. 2 is a diagram showing a principle of the MIMO communication system in the embodiment.

Further, the MIMO communication system in the embodiment exemplifies the receivers 21, 22 and 23 having the number of antennas as shown in FIGS. 1 and 2, however, this is nothing but the exemplification, and there may be a single receiver having four pieces of antennas and may also be two receivers each having two pieces of antennas. Namely, the MIMO communication system in the embodiment limits neither the configuration of the receiver nor the configuration of the transmitter.

<Principle of System>

Next, the principle of the MIMO communication system having the H/W architecture described above in the embodiment will be explained with reference to FIG. 2. FIG. 2 is a diagram showing the principle of the MIMO communication system in the embodiment.

In the MIMO communication system in the embodiment, the transmitting side previously executes the signal processing corresponding to, e.g., the number of antennas held by the receiver. The transmitter 11 performs the signal processing on the signals so that the symbol data series of which the number is equal to or smaller than the number corresponding to the number of receiving antennas possessed by the respective receivers 21, 22 and 23 reach the respective receivers, and transmits the signals. To be specific, the transmitter 11 performs the signal processing based on the transmission characteristic information on the signals so that one symbol data series directed to the receivers 21, 22 each having one antenna reaches each of the receivers 21, 22, and transmits the signals. Further, the transmitter 11 performs the signal processing on the signals so that two or less symbol data series (which are the data for two antennas) directed to the receiver 23 having two antennas reach the respective antennas as the symbol data of the receiver 23 itself, and transmits the signals. For instance, the signal processing may also be performed so that first and second symbol data series reach both of first and second antennas, and so that the first symbol data series reach the first antenna and the second symbol data series reach the second antenna.

Herein, the principle of the signal processing by the transmitter 11 will be explained.

To start with, the signal sent from the transmitter 11 is influenced by a transmission environment of the respective channels between the transmitter 11 and the respective receivers 21, 22, 23. Further, in the MIMO communication system, plural items of data are transmitted from the plurality of transmitting antennas, and hence the signals sent therefrom pass through a variety of communication paths and are received by the respective receiving antennas in the form of being synthesized with the signals sent from other antennas. Therefore, in the case of transforming the channel transmission environment into numerical values, this can be expressed by a matrix corresponding to the number of antennas held by the transmitter and the number of antennas held by the receiver.

Specifically, in the MIMO communication system in the embodiment, when $h_{ij}$ represents transmission characteristics of transmission paths from four pieces of transmitting antennas i to four pieces of receiving antennas j, whereby the channel transmission environment can be expressed by a matrix H (which will hereinafter be called a transmission path matrix H) in a formula (1.1).

Then, when the transmission signal and the receipt signal are expressed in vector, a transmission signal vector x and a receipt signal vector y can be expressed by a formula (1.2).

$$H = \begin{pmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{pmatrix} \quad (1.1)$$

$$y = Hx + n \quad (1.2)$$

where n is a noise vector of each of the receiving antennas.

The signal vectors of the signals received by the receivers 21, 22 and 23 are expressed by the formula (1.2), and hence the transmitter 11 executes the following process in order for the symbol data series of which the number corresponds to the number of antennas of the receiving antennas held by the receivers 21, 22 and 23 to reach the respective receivers. Namely, the transmitter 11 executes the process of multiplying the transmission symbol data by a 4-row/4-column matrix G (which will hereinafter be called a change-of-variable matrix G) that satisfies the following formula (1.3).

$$F = \begin{pmatrix} f_{11} & 0 & 0 & 0 \\ 0 & f_{22} & 0 & 0 \\ 0 & 0 & f_{33} & f_{34} \\ 0 & 0 & f_{43} & f_{44} \end{pmatrix} = \begin{pmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{pmatrix} \cdot G \quad (1.3)$$

With the transmission of the signals subjected this change of variable, it follows that the receivers 21 and 22 each having the single receiving antenna receive one self-addressed data series, and the receiver 23 having the two antennas receive the two data series in parallel. Herein, $f_{ij}$ is an appropriate complex number. Namely, let $x_0$ be a pre-transformation symbol data vector, and the receiving data vector y can be expressed by a calculation formula as by the formula (1.4).

$$y = Hx = HGx_0 = Fx_0 = \begin{pmatrix} f_{11} & 0 & 0 & 0 \\ 0 & f_{22} & 0 & 0 \\ 0 & 0 & f_{33} & f_{34} \\ 0 & 0 & f_{43} & f_{44} \end{pmatrix} x_0 \quad (1.4)$$

As can be understood also from the formula (1.4), with the multiplication by the change-of-variable matrix G, the transmitter 21 may simply consider only the signals influenced by only the element $f_{11}$, i.e., the signals that are transmitted from the transmitting antenna 1 and should be received by the receiver 11 without taking account of the synthesis of the signals transmitted from other antennas. That is, the influence of the signals transmitted from other antennas can be already restrained at a stage of receiving the signals by the self-antenna.

This is the same with the receiver 22. The receiver 23, as the influence of the transmission signals from other antennas were already restrained at the stage of receiving the signals by the self-antenna, may simply consider the signals influenced by elements $f_{33}$, $f_{34}$, $f_{43}$, and $f_{44}$, i.e., the signals received by the two antennas possessed by the receiver 23.

<Functional Configuration>

Figure 3A:
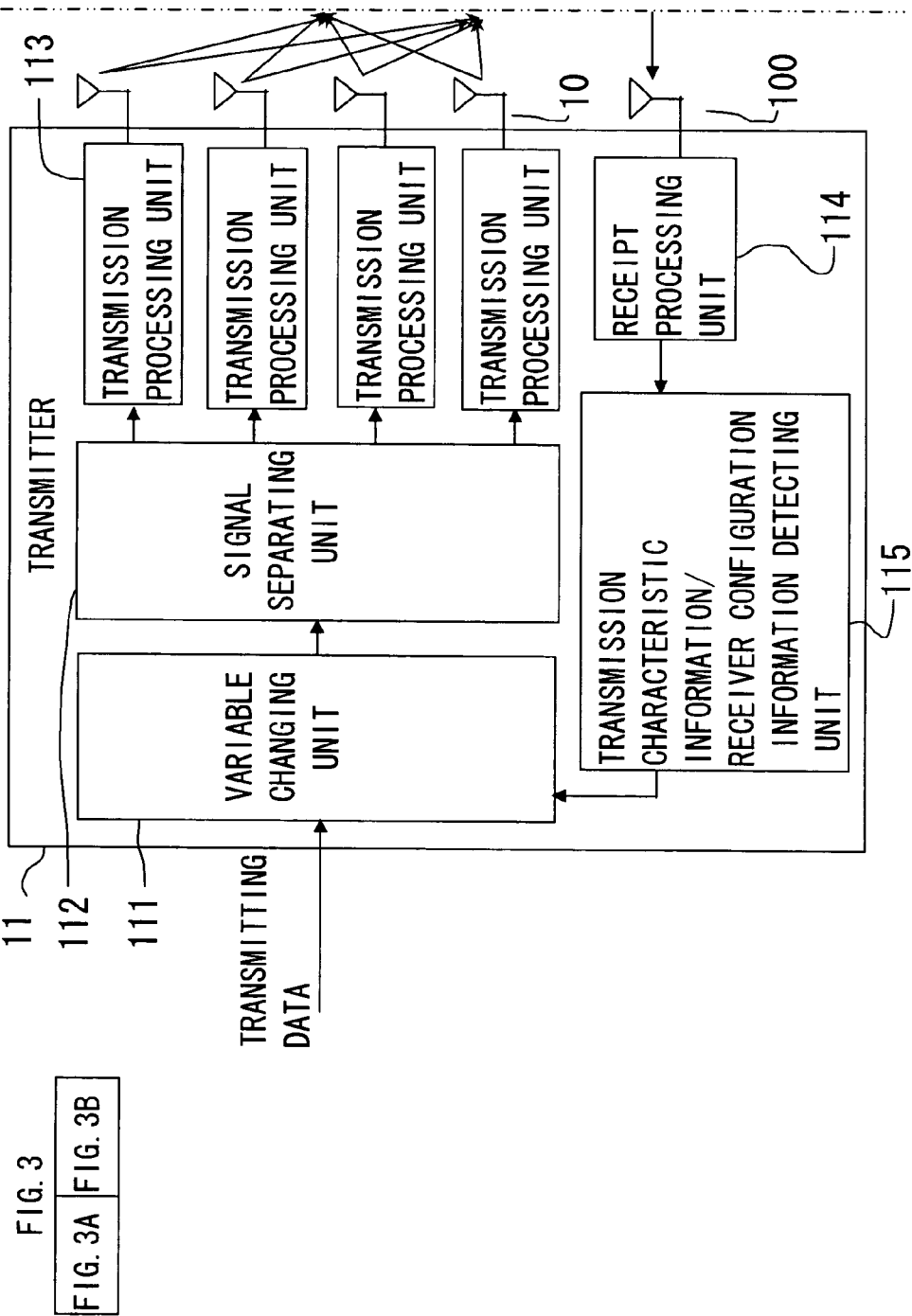
FIG. 3 is a diagram showing a functional configuration of the MIMO communication system in the embodiment.

Next, functions of the respective devices in the MIMO communication system in the embodiment will be described with reference to FIG. 3. FIG. 3 is a diagram showing a functional configuration of the MIMO communication system in the embodiment. The functional units shown in FIG. 3 actualize the principle of the system described earlier. FIG. 23 shows the transmitter 11 and the receiver 23 illustrated in FIG. 1. The receivers 21, 22 unillustrated in FIG. 3 have the same configuration as that of the receiver 23 except that each of the receivers 21, 22 has a single piece of antenna and has none of high-level demodulating function (which is a signal separating function exemplified as below).

To begin with, the functional configuration of the transmitter 11 will be explained as follows. The transmitter 11 is constructed of a variable changing unit 111 (corresponding to a transmission unit and a transformation unit according to the present invention), a signal separating unit 112, a transmission processing unit 113, antenna elements 10, an antenna element 100, a receipt processing unit 114 and a transmission characteristic information/receiver configuration information detecting unit 115 (corresponding to a detection unit according to the present invention).

<<Variable Changing Unit 111>>

The variable changing unit 111 obtains (updates), based on transmission characteristic information and receiver configuration information inputted from the transmission characteristic information/receiver configuration information detecting unit 115, the change-of-variable matrix G that satisfies the formula (1.3). A method by which the variable changing unit 111 obtains the change-of-variable matrix G will be explained in depth in an item of <Operational Example>.

The variable changing unit 111, when a data transmission request is given, multiplies the transmission symbol data by this change-of-variable matrix G, and outputs the transmission symbol data after being multiplied to the signal separating unit 112.

<<(Signal Separating Unit 112>>

The signal separating unit 112 separates the serially-arranged symbol data signals inputted from the variable changing unit 111 in parallel for every antenna to which the data signal is transmitted, and outputs the data signal to the transmission processing unit 113 for sending from each of the antenna elements 10. The signal separating unit 112, when separating the signals, by a use of the symbol data signal inputted from the variable changing unit 111, determines the antenna to which the symbol data signal should be transmitted. This transmitting antenna is determined based on the transmission signal transformed by the variable changing unit 111.

<<(Transmission Processing Unit 113>>

The transmission processing units 113 output, to the antenna elements 10, high-frequency signals obtained by performing a modulation process upon the transmission signals inputted from the signal separating unit 112. Simultaneously, the transmission processing units 113 transmit a plurality of different known signals (which will hereinafter be referred to as transmission characteristic estimation signals) having signal patterns orthogonal to each other in order to make the receiver 23 estimate a transmission path characteristic. Note that the transmission processing units 113 in the embodiment are configured in the form of being divided for every antenna element 10 and may also be made to operate in the form of being organized into one unit.

<<(Antenna Element 10)>>

The antenna element 10 is an antenna for transmitting the high-frequency signals outputted from the transmission processing units 113 to the receiver 23. Though explained later on, the antenna element 10 can be constructed as a transmitting/receiving dual-purpose antenna by use of a duplexer, etc.

<<Antenna Element 100>>

The antenna element 100 is an antenna for receiving the high-frequency signals transmitted from an antenna element 200 of the receiver 23. The high-frequency signals received by the antenna element 100 are outputted to the receipt processing unit 114.

<<Receipt processing Unit 114>>

The receipt processing unit 114 acquires the receipt signals by effecting an amplifying process upon the high-frequency signals inputted from the antenna element 100. The receipt processing unit 114 outputs the receipt signals to the transmission characteristic information/receiver configuration information detecting unit 115.

<<Transmission Characteristic Information/Receiver Configuration Information Detecting Unit 115>>

The transmission characteristic information/receiver configuration information detecting unit 115 detects data of the transmission characteristic information and data of the receiver configuration information from the inputted receipt signals (receipt signals received from each of the receivers). The detected transmission characteristic information and the detected receiver configuration information are outputted to the variable changing unit 111. Note that the transmission characteristic information and the receiver configuration information are detected and generated by the receiver 23. Incidentally, the receiver configuration information may be acquired from a upper device side. For example, the receiver configuration information is stored in an HLR (Home Location Register), and is downloaded as the necessity may arise. On this occasion, the respective terminal configurations may be distinguished from each other by use of terminal IDs, etc.

Next, the functional configuration of the receiver 23 will be explained as below. The receiver 23 is constructed of an antenna element 203, a receipt processing unit 231, a transmission characteristic estimating unit 232 (corresponding to an extraction unit according to the present invention), a signal separating/data detecting unit 233, a transmission characteristic information/receiver configuration information generating unit 234, a transmission processing unit 235 (corresponding to an information transmitting unit according to the present invention), and an antenna element 200.

<<(Antenna Element 203)>>

The antenna element 203 is an antenna for receiving the signals transmitted from the antenna elements 10 of the transmitter 11. The high-frequency signals received by the antenna element 203 are outputted to the receipt processing unit 231. As will be explained later on, the antenna element 203 may be constructed as a transmitting/receiving dual-purpose antenna as in the case of the antenna 100.

<<(Receipt Processing Unit 231)>>

The receipt processing unit 231 acquires the receipt signals by executing the amplifying process, etc. upon the high-frequency signals inputted from the antenna element 203. The receipt signals are outputted to the signal separating/data detecting unit 233 and to the transmission characteristic estimating unit 232.

<<Transmission Characteristic Estimating Unit 232>>

The transmission characteristic estimating unit 232 obtains a transmission path matrix H of the transmission paths between the antenna elements 10 and the antenna elements 203 by use of the known signals, etc. from the inputted receipt signals, and estimates transmission characteristic information expressed by a transmission characteristic matrix F (=HG) in a form multiplied by a change-of-variable matrix G by which the variable changing unit 111 of the transmitter 11 multiplies the transmission signals. In the embodiment, the transmission characteristic matrix F is a matrix expressed by the formula (1.4), and it follows that the change-of-variable matrix G can be updated with this estimated value, corresponding to, even when the transmission path changes, this change. Further, the transmission characteristic information is matrix elements $f_{33}$, $f_{34}$, $f_{43}$, and $f_{44}$ of the transmission characteristic matrix F shown in the formula (1.4) in the transmission characteristic estimating unit 232 of the receiver 23. Note that the matrix elements $f_{11}$ and $f_{22}$ of the transmission characteristic matrix F shown in the formula (1.4) are estimated in the unillustrated receivers 21 and 22.

Then, the transmission characteristic estimating unit 232 outputs the transmission characteristic information to the signal separating/data detecting unit 233. This transmission path matrix H, the transmission path becoming different corresponding to each antenna element on the receiving side, as a matter of course, changes for every antenna element receiving the signal. Accordingly, the transmission characteristic estimating unit 232 is prepared for every antenna element 203 and estimates the transmission characteristic information from the signals received by each antenna. An in-depth description of how the transmission characteristic estimating unit 232 estimates the transmission characteristic information, will be given in the item of <Operational Example>.

<<Signal Separating/Data Detecting Unit 233>>

The signal separating/data detecting unit 233 separates the receipt signals (which will hereinafter be called a signal separating function) based on the MIMO method by employing the transmission characteristic information (the matrix elements $f_{33}$, $f_{34}$, $f_{43}$, and $f_{44}$ shown in the formula (1.4)) inputted from the transmission characteristic estimating unit 232, and detects the receiving data. Note that the detection of the receiving data may involve employing MLD, etc.

Further, the unillustrated receivers 21 and 22 may not have the signal separating function with the signal processing performed by the transmitter 11 as the transmitting side so that each of the receivers receives only the signals that should be received by the self-receiver.

<<Transmission Characteristic Information/Receiver Configuration Information Generating Unit 234>>

The transmission characteristic information/receiver configuration information generating unit 234 generates the receiver configuration information of the self-device (e.g., stores the configuration information on an unillustrated memory, reads the information therefrom and generates the information), and also generates the transmission data to be transmitted together with the transmission characteristic information estimated by the transmission characteristic estimating unit 232 to the transmitter 11. In the embodiment, it is assumed that the receiver configuration information contains information about the number of antennas held by the receiver 23 (this is the same with other receivers).

<<Transmission Processing Unit 235>>

The transmission processing unit 235 performs the modulation process upon the transmission signals in order to transmit, to the transmitter 11, the transmission data containing the transmission characteristic information and the receiver configuration information inputted from the transmission characteristic information/receiver configuration information generating unit 234 by a use of signaling etc., and outputs the high-frequency signals to the antenna element 200. Simultaneously, the transmission processing unit 235 transmits the transmission characteristic estimation signals with their signal patterns orthogonal to each other to make the transmitter 11 estimate the transmission path characteristic.

Note that the known signals for the transmission characteristic estimation may be transmitted in the form of being distinguished from the actual transmission data by employing a timewise separating method with respect to the data, a spread-code based separating method utilizing CDMA, a sub-carrier frequency based separating method utilizing OFDM (Orthogonal Frequency Division Multiplexing) and a combined method of these separating methods.

<<Antenna Element 200>>

The antenna element 200 is an antenna for transmitting, to the transmitter 11, the high-frequency signals outputted from the transmission processing unit 235.

<Receiver Configuration Information>

Next, the receiver configuration information of which each of the receivers 21-23 notifies the transmitter 11, will be explained as follows.

An example of employing the number of antennas for every receiver is given as the receiver configuration information in the embodiment. The receiver configuration information can be also categorized as below by way of other example. Further, it is also possible to categorize in a way that combines the following categorizations.

(Categorization 1) Categorization corresponding to the number of antennas held by the receiver.

(Categorization 2) Categorization corresponding to the demodulation method held by the receiver. The demodulation method connoted herein can exemplify the aforementioned signal separating function. There is considered a case, wherein the receiver is categorized as a receiver capable of demodulating received signals into which radio signals transmitted from the transmitter are synthesized with radio signals transmitted from other antenna possessed by this transmitter, or a receiver capable of demodulating only the signals received in the form of being separated so as not to be synthesized with the radio signals transmitted from other antenna, or a receiver capable of demodulating by sue of signals that are partially separated and received by other receiving antenna. An operation of the transmitter 11 in this case will be explained in detail in an item of <<Generation of Change-of-Variable Matrix G Suited to Configuration of Receiver>>.

(Categorization 3) Categorization corresponding to a data identifying method held by the receiver. For instance, there is considered a case of categorization depending on whether MLD or MMSE (Minimum Mean Square Error).

OPERATIONAL EXAMPLE

<<Estimation of Transmission Characteristic Information by Transmission Characteristic Estimating Unit 232>>

The transmission characteristic estimating unit 232 estimates the transmission characteristic information from the received signals. This transmission characteristic information is estimated by the following method as elements of the transmission characteristic matrix F expressed by the formula (1.4) and comprising of the transmission path matrix H reflecting the transmission path environment and the change-of-variable matrix G multiplied by the transmitter 11.

The transmission characteristic estimating unit 232 estimates the transmission characteristic information by use of the transmission characteristic estimation signals as the known signals given from the transmitter 11. To be specific, the transmission characteristic estimating unit 232 estimates the matrix elements $f_{33}$, $f_{34}$, $f_{43}$, and $f_{44}$ shown in the formula (1.4).

The transmission characteristic estimation signals involve using data patterns (1, 1, 1, 1), (1, −1, 1, −1) (1, 1, −1, −1) and (1, −1, −1, 1) defined as the known signals with their signal patterns orthogonal to each other. Note that each data pattern is transmitted from each of the transmitting antennas. Then, preferably, the known signals orthogonal to each other are transmitted from the respective receiving antennas of the receiver and also received by the transmitting antenna of the transmitter in order for the transmitter to estimate the transmission path (H) between each of the receiving antennas of each receiver and the transmitting antenna of the transmitter.

From the left element in the brackets, there are shown the first symbol data, the second symbol data, the third symbol data and the fourth symbol data. In the receiver 23 receiving the transmission characteristic estimation signals, the data received by one of the two receiving antennas are expressed such as $y_{1,1}$ and $y_{1,2}$ in the formula (2.1) and the formula (2.2). The symbol $y_{1,1}$ represents the first symbol receipt data, and the symbol $y_{1,2}$ represents the second symbol receipt data. With this operation, the transmission characteristic estimating unit 232 of the receiver 23 estimates $f_{33}$ by adding the two symbols and estimates $f_{34}$ by subtracting the symbols. Note that the estimations of $f_{33}$ and $f_{34}$ employ only the first symbol data and the second symbol data, however, as a matter of course, the third symbol data and the fourth symbol data may also be used.

The data $y_{2,1}$ and $y_{2,2}$ received by the other receiving antenna are subjected to the same processing, thereby estimating $f_{43}$ and $f_{44}$.

$$y_{1,1} = f_{33} + f_{34} \quad (2.1)$$

$$y_{1,2} = f_{33} - f_{34} \quad (2.2)$$

$$y_{2,1} = f_{43} + f_{44} \quad (2.3)$$

$$y_{2,2} = f_{43} - f_{44} \quad (2.4)$$

Note that the known signals for the transmission characteristic estimation may be transmitted in the form of being distinguished from the actual transmission data by employing the timewise separating method with respect to the data, the spread-code based separating method utilizing CDMA (Code Division Multiple Access), the sub-carrier frequency based separating method utilizing OFDM (Orthogonal Frequency Division Multiplexing) and the combined method of these separating methods.

<<Generation of Change-of-Variable Matrix G by Variable Changing Unit 111>>

The transmission path environment momentarily changes, and hence, unless the change-of-variable matrix G is used in response to changing in the transmission path environment, the communications exhibiting a high-level wireless characteristic can not be performed. Such being the case, the way of how the variable changing unit 111 obtains the change-of-variable matrix G reflecting the latest transmission path environment, will be next described as below.

At first, the variable changing unit 111 obtains the latest transmission path matrix H by making use of the transmission characteristic information to be transmitted to the transmitter 11 from each of the receivers 21, 22, 23. Namely, the transmission characteristic information ($f_{11}$, $f_{22}$, $f_{33}$, $f_{34}$, $f_{43}$, and $f_{44}$) transmitted from the respective receivers 21, 22, 23 consists of the change-of-variable matrix G by that the variable changing unit 111 multiplies the transmission data last time and the transmission path matrix H reflecting the transmission path environment at that time (F=HG), and therefore the variable changing unit 111 acquires the transmission path matrix H by employing the change-of-variable matrix G used last time, which corresponds to this transmission characteristic matrix F. Then, the variable changing unit 111 obtains a new change-of-variable matrix G by use of the latest transmission characteristic information F received and the formula (1.3) from the obtained transmission path matrix H.

Further, on the occasion of getting the feedback about the transmission characteristic information and the receiver configuration information to the transmitter from the receiver, when the transmission processing unit 235 utilizes TDD (Time Division Duplex), the different and orthogonal known signals (the transmission characteristic estimation signals) may be transmitted from the respective receivers. With this operation, the variable changing unit 111 estimates the transmission path matrix H by employing the transmission characteristic estimation signals, thereby acquiring the change-of-variable matrix G. Namely, as the proper transmission characteristic information F (e.g., as shown in FIG. 3, other elements excluding a part of the elements (which is set to, e.g., 1) are set to 0), the change-of-variable matrix G is obtained by using the formula (1.3) and can be employed for converting the transmission signal.

Note that the first setting of the change-of-variable matrix G, in the case of adopting, e.g., the TDD method employing the same frequency and so on, can be done by the transmitter estimating the transmission path between each receiving antenna of each receiver and the transmitting antenna of the transmitter.

In short, the orthogonal known signals are transmitted from the respective receiving antennas of the receiver and received by the transmitting antenna of the transmitter, thereby estimating the transmission path matrix H. If the TDD method is adopted, bidirectional paths can be deemed as the same transmission paths, and hence there are obtained the estimated transmission path matrix H and the change-of-variable matrix G as the proper transmission characteristic information F (e.g., as shown in FIG. 3, other elements excluding a part of the elements (which is set to, e.g., 1) are set to 0), and these matrixes can be employed for the conversion of the transmission signals. On this occasion, as a matter of course, it is desirable that the receiver configuration information be also employed.

<<Generation of Change-of-Variable Matrix G Suited to Configuration of Receiver>>

As described above, the receiver configuration information (for example, the number of antennas) is fed back to the transmitter 11, whereby the variable changing unit 111 of the transmitter 11 obtains the change-of-variable matrix G corresponding to the receiver configuration information.

Given hereunder is an example of the operation of the variable changing unit 111 of the transmitter 11 that obtains the change-of-variable matrix G in accordance with, herein, the demodulation method of the receiver in the receiver configuration information (Categorization 2) described above. To be specific, the operation of the transmitter in the case of differing from the configuration of the receiver in the MIMO communication system in the embodiment shown in FIGS. 1 and 2, will be described as below.

(First Configuration)

In the MIMO communication system in the embodiment, the receiver 23 holding the two antennas has the configuration that the signal separating/data detecting unit 233 has the signal separating function. The first configuration, which will be described herein, is a case of being constructed of the receiver capable of demodulating only the signals received in the form of being separated so as not to be synthesized with the radio signals transmitted from other antennas.

In this case, the transmission characteristic information/receiver configuration information generating unit 234 of the receiver 23 organizes the receiver configuration information so as to contain a piece of category information showing that the receiver has the demodulation method as described above. Then, the variable changing unit 111 obtains, based on the category information, a change-of-variable matrix G that will be given as follows. Subsequently, the variable changing unit 111 multiplies the transmission data by this change-of-variable matrix G and transmits the data, and each receiver may detect the data per antenna.

The transmitter configuring the MIMO communication system according to the present invention can correspond to the case where such a simple receiver exists.

$$F = HG = \begin{bmatrix} f_{11} & 0 & 0 & 0 \\ 0 & f_{22} & 0 & 0 \\ 0 & 0 & f_{33} & 0 \\ 0 & 0 & 0 & f_{44} \end{bmatrix} \quad (1.5)$$

(Second Configuration)

A second configuration is a case in which there is one single receiver holding four pieces of antennas, and the receiver has the following demodulation method. The receiver in the second configuration enables simple modulation in the way that the receiver provides predetermined order per antenna, the data are detected with respect to the signals received by the antennas in this order, and a result of the data detection in the earlier order is utilized on the occasion of the data detection.

In this case, the transmission characteristic information/receiver configuration information generating unit 234 of the receiver 23 organizes the receiver configuration information so as to contain a piece of information showing that the demodulation method described above is adopted. Then, the variable changing unit 111 obtains, based on this information, the change-of-variable matrix G shown in the formula (1.6). Subsequently, the variable changing unit 111 multiplies the transmission data by this change-of-variable matrix G, and transmits the data, whereby the receiver can demodulate the data received from the antennas in the predetermined order.

Namely, in this example, the signal received by the receiving antenna corresponding to the first row in the following matrix or a transmission signal $x_1$ is obtained. Next, a transmission signal $x_2$ is obtained by use of a signal received by the receiving antenna corresponding to the second row in the following matrix and the transmission signal $x_1$, sequentially, and results that are thus acquired in the order from the top are utilized at the receiving time, thereby making it possible to easily regenerate the transmission signals.

Note that the respective elements such as $f_{11}$, etc. can be estimated by use of the known signals, and it follows that unknown transmission signals are easily obtained while giving a degree of freedom to some extent to the elements of the matrix F.

$$F = HG = \begin{bmatrix} f_{11} & 0 & 0 & 0 \\ f_{21} & f_{22} & 0 & 0 \\ f_{31} & f_{32} & f_{33} & 0 \\ f_{41} & f_{42} & f_{43} & f_{44} \end{bmatrix} \quad (1.6)$$

(Third Configuration)

A third configuration is a case of the receiver capable of demodulating the signals obtained by synthesizing the radio signals transmitted from the transmitter with the radio signals transmitted from other antenna possessed by this transmitter and received.

Even in the case of this receiver having the highest-level data detecting function, the variable changing unit 111 obtains the change-of-variable matrix G shown in the formula (1.7) by which a transmission capacity can be maximized without any restraint condition. Namely, the variable changing unit 111 sets the elements fixed to "0" less than a half, ideally, to zero (0).

$$F = HG = \begin{bmatrix} f_{11} & f_{12} & f_{13} & f_{14} \\ f_{21} & f_{22} & f_{23} & f_{24} \\ f_{31} & f_{32} & f_{33} & f_{34} \\ f_{41} & f_{42} & f_{43} & f_{44} \end{bmatrix} \quad (1.7)$$

MODIFIED EXAMPLE 1

In the MIMO communication system in the embodiment, the transmitter executes the signal processing based on the configuration of the receiver, however, the transmission path matrix H as the transmission path information is employed on the occasion of effecting the signal processing.

Namely, the transmitter side knows the transmission path information, and hence the signal processing may be executed to perform the high-speed data transmission on the transmission path exhibiting a high quality of the transmission path, and to perform the low-speed data transmission on the low-quality transmission path (which corresponds to a transmission rate control unit according to the present invention).

With this contrivance, the high-speed data transmission can be performed as a whole of the system.

MODIFIED EXAMPLE 2

Further, the higher-speed data transmission may additionally be conducted on the high-quality transmission path by increasing the electric power for transmission, and the lower-speed data transmission may be effected on the low-quality transmission path by decreasing the electric power for transmission. With this contrivance, the higher-speed data transmission can be done as a total system because of getting approximate to the power control based on Water Filling Principal. In this case, for example, when constructed of the simple receiver as in the aforementioned (first configuration), the transmitter may execute processing as below.

The transmitter at first effects weighting in a way that multiplies the change-of-variable matrix G given in the formula (1.8) with respect to the transmission path matrix H by a weighting coefficient $w_i$ so that an electric power weight $P_i$ with respect to a diagonal section $a_i$ of the matrix A shown in the formula (1.9) meets the formula (1.10). Herein, $^H$ represents Conjugate Transpose, max (x, y) indicates that the larger of x and y is selected, and $\lambda$ and $\sigma 2$ are constants determined from average transmission power and noise power. The transmitter multiplies the weighted signal by the change-of-variable matrix G in the same way as in the embodiment, and transmits this signal.

$$G = H^{-1} \quad (1.8)$$

$$A = G^H G \quad (1.9)$$

-continued $$P_i = \max\left(0, \frac{\lambda}{a_i} - \sigma^2\right) \quad (1.10)$$

$$w_i = \sqrt{P_i} \quad (1.11)$$

$$C_i \propto \log\left(1 + \frac{w_i^2}{\sigma^2}\right) \quad (1.12)$$

The transmitter may further effect rate matching upon each symbol data series so as to gain a transmission rate proportional to $C_i$ shown in the formula (1.12), and may thus transmit the symbol data series.

FIG. 4 is a diagram showing an example of the transmitter that executes power weighting corresponding to the transmission path information and transmission rate control. The transmitter shown in FIG. 4 puts a weight $w_1$-$w_4$ on the transmission signal controlled to have a transmission rate of a transmission rate $C_1$-$C_4$ for every transmitting antenna.

With this contrivance, the high-speed data transmission can be done as the total system.

MODIFIED EXAMPLE 3

The system described so far has the configuration in which the transmission side can know the transmission path information and may also take a configuration in which the transmission side can not know the transmission path information. In this case also, it is possible to adopt the transmission method corresponding to the receiver by notifying the transmission side of the receiver configuration information.

Figure 5A:
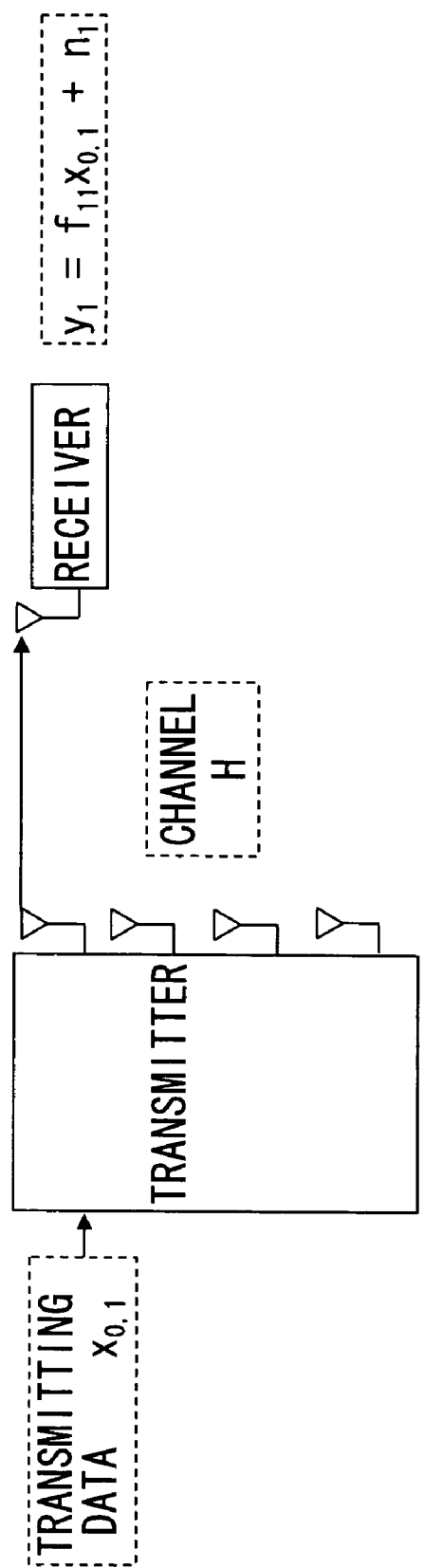
FIGS. 5A and 5B are diagram showing a modified example in a case where a transmission side can not know the transmission path information.
Figure 5B:
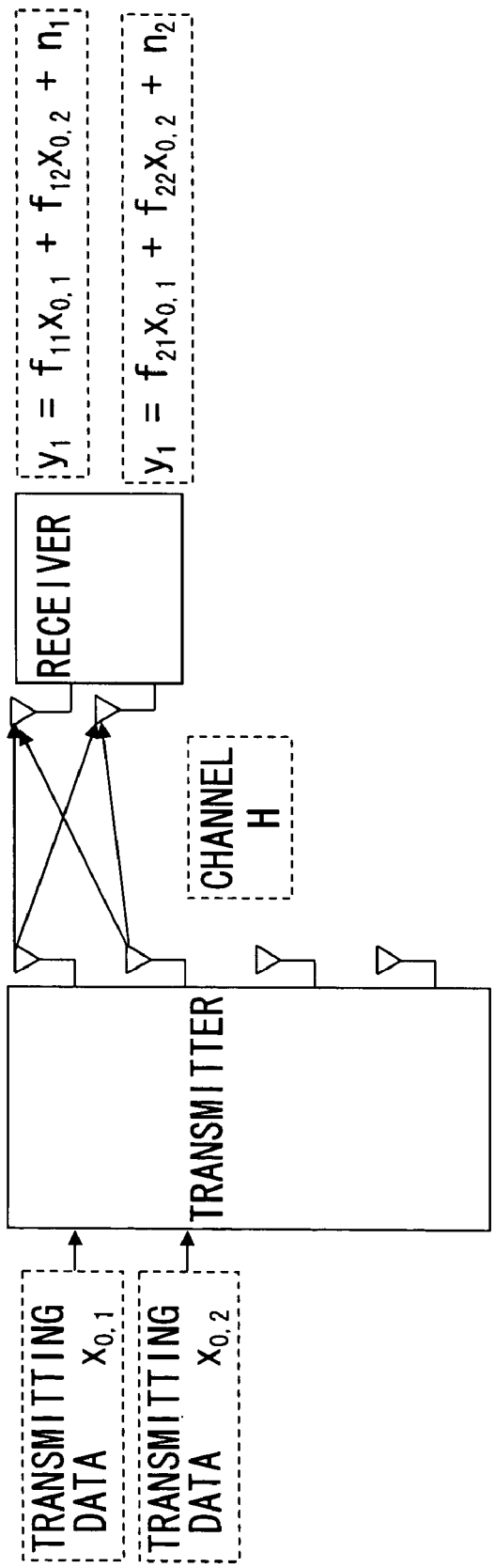

FIGS. 5(A) and 5(B) show the MIMO communication system in the case of a configuration in which the transmitter can not know the transmission path information. In FIG. 5(A), the transmitter is notified of the number of antennas held by the receiver and thereby transmits the signals from one arbitrary transmitting antenna to the receiver having the single antenna. Similarly, in FIG. 5(B), the signals are transmitted from the two transmitting antennas to the receiver having the two antennas.

Figure 6A:
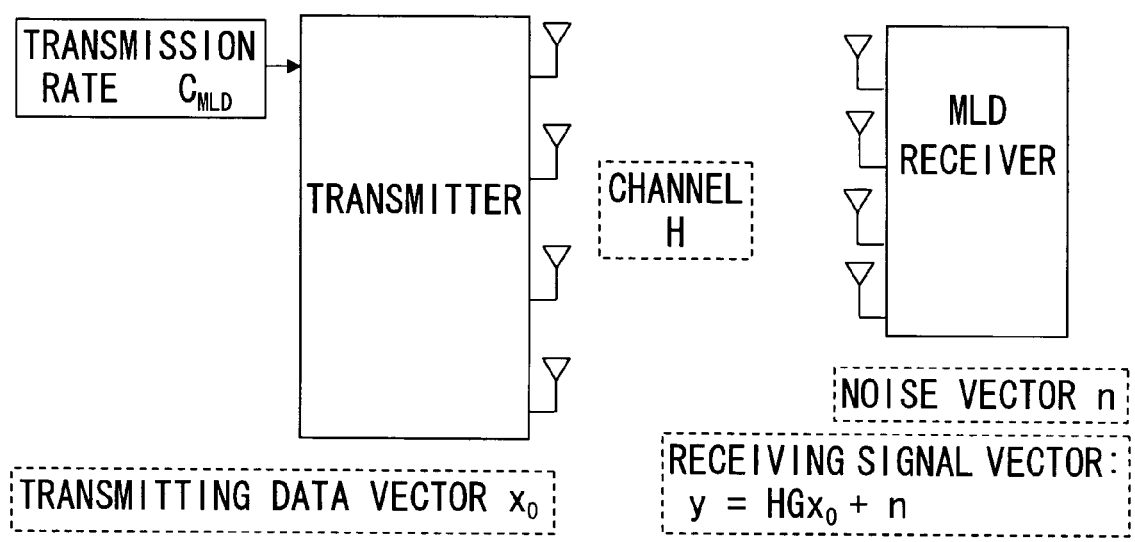
FIGS. 6A and 6B are diagram showing a modified example 2 in a case where a transmission side can not know the transmission path information.
Figure 6B:
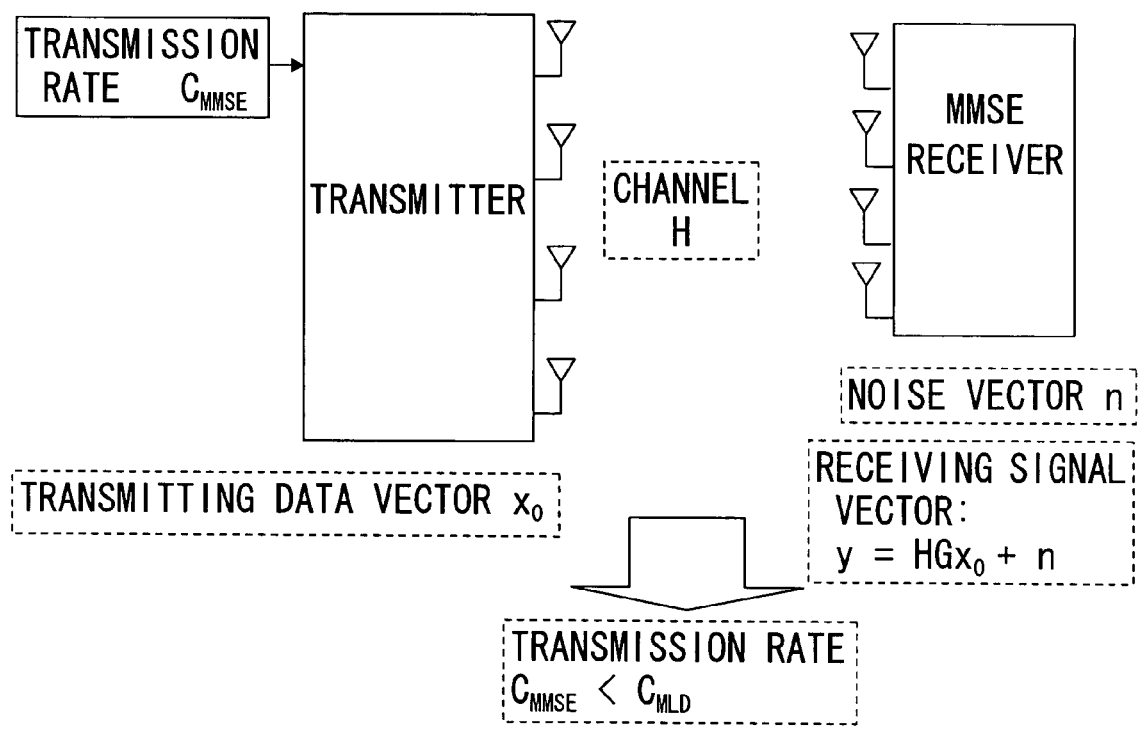
Figure 7:
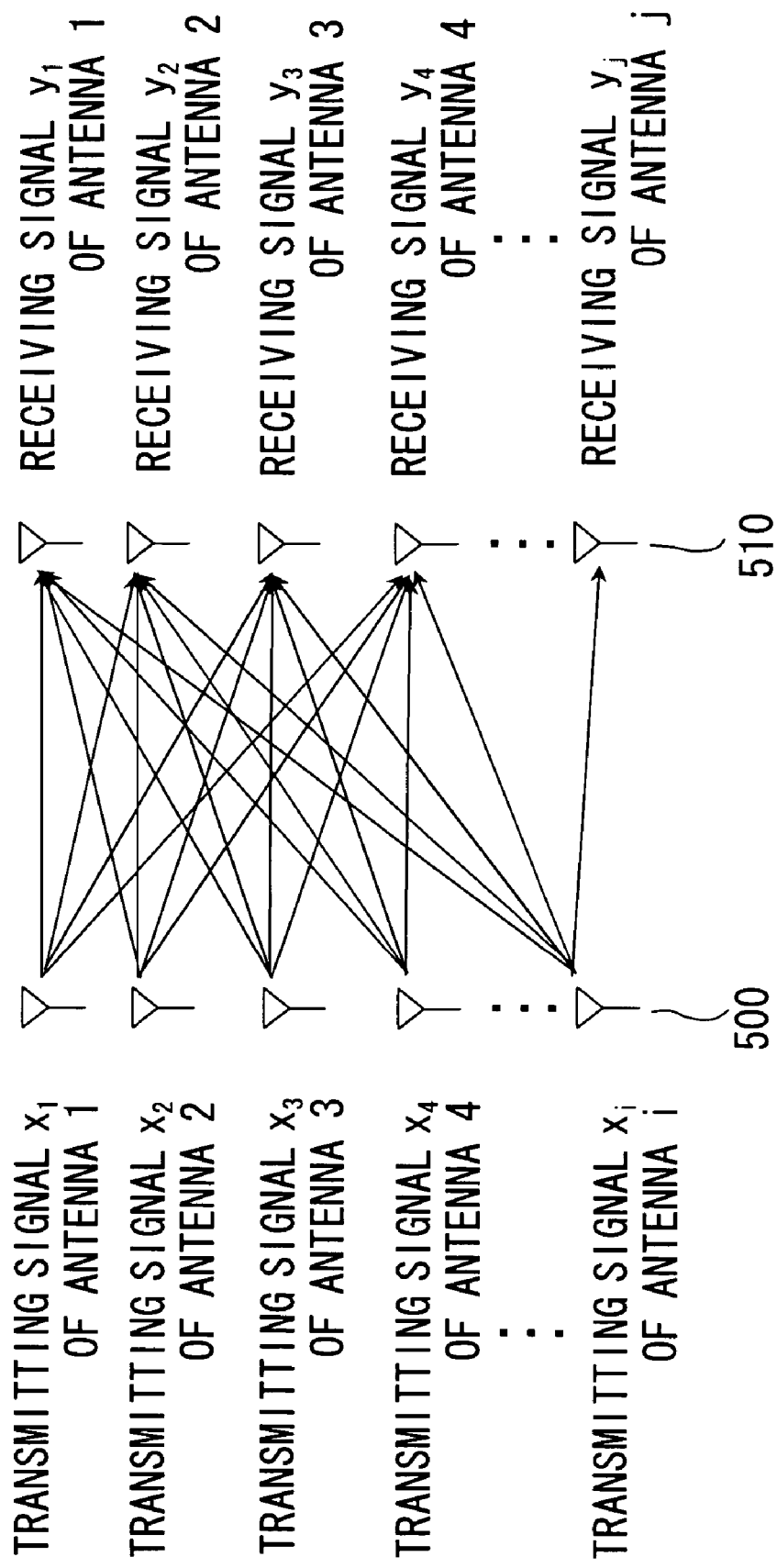
FIG. 7 is a diagram showing an outline of the MIMO communication system.
Figure 8:
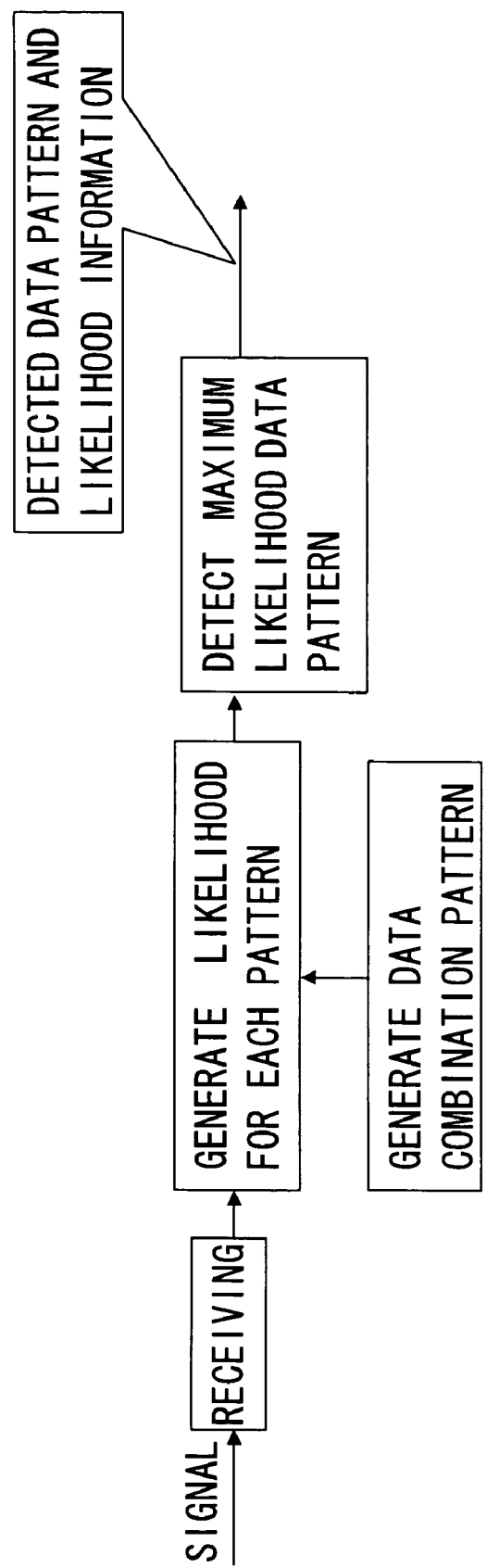
FIG. 8 is a diagram showing an outline of MLD.
Figure 9A:
FIGS. 9A and 9B are diagram showing an outline of a Pre-Rake method.
Figure 9B:
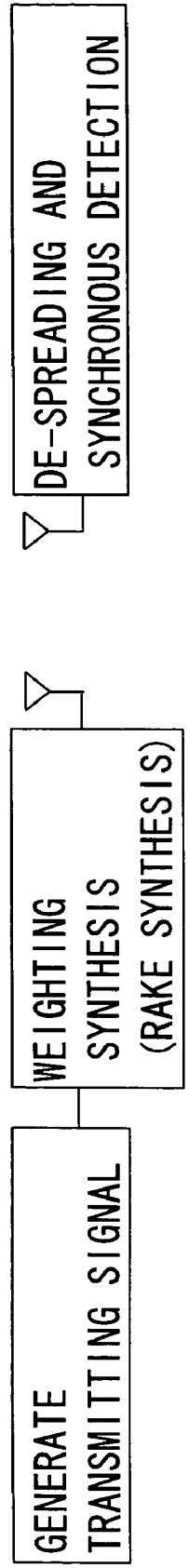
Figure 10A:
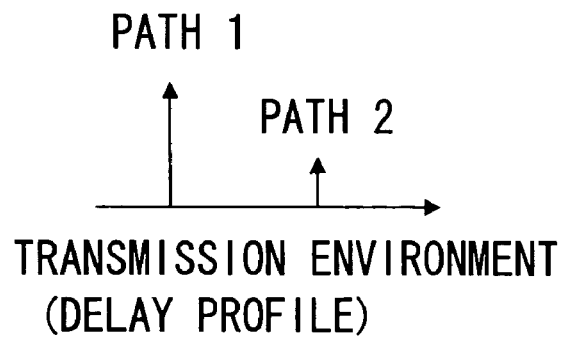
FIGS. 10A and 10B are diagram showing an outline of weighting synthesis by the Pre-Rake method.
Figure 10B:
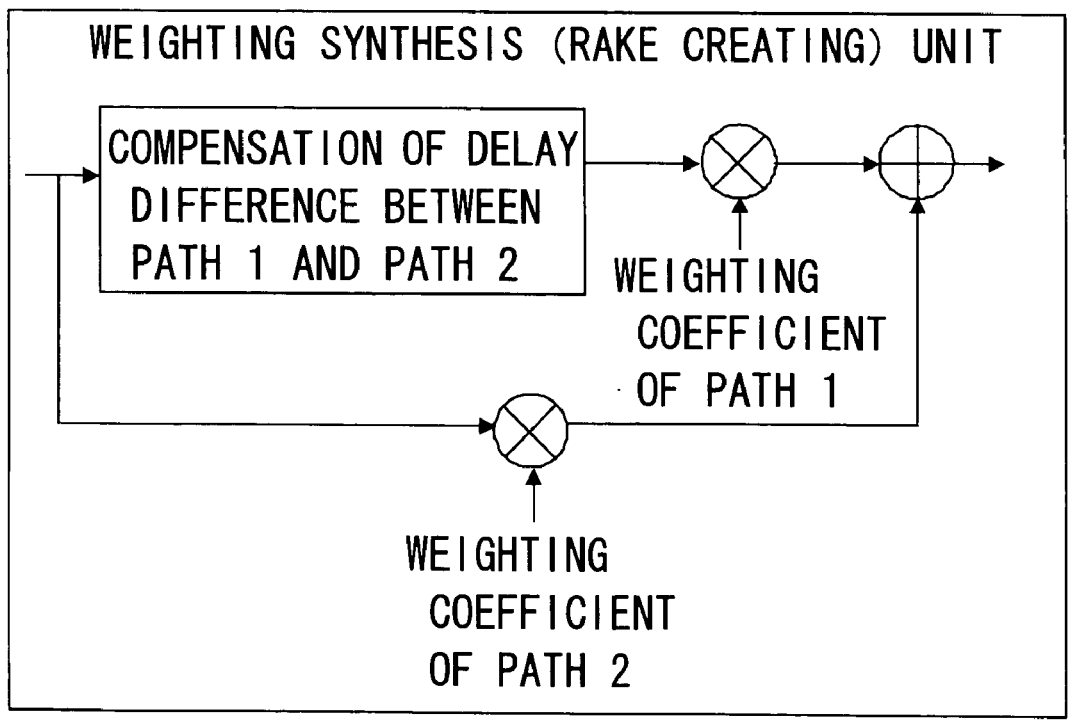

Moreover, there are categorized, according to not the number of antennas but a type of receiver, into a case of being a MLD receiver and a case of being an MMSE (Minimum Mean Square Error) receiver, and the transmitter may control the transmission rate. FIG. 6(A) shows the case of having the MLD receiver, and FIG. 6(B) shows the example of having the MMSE receiver. The transmitter in this case controls the transmission rate to perform the high-speed data transmission to the MLD receiver exhibiting a high wireless characteristic and to perform the low-speed data transmission to the MMSE receiver inferior in characteristic to the MLD receiver.

With this contrivance, even in the case where the transmitter has such a configuration as to be unrecognizable of the transmission path information, it is possible to conduct the transmission corresponding to the configuration of the receiver.

<Others>

The disclosures of Japanese patent application No. JP2005-006352, filed on Jan. 13, 2005 including the specification, drawings and abstract are incorporated herein by reference.

What is claimed is:

1. A wireless communication system including a transmitting device having a plurality of antennas, transmitting different radio signals from each of the plurality of antennas and communicating with a plurality of receiving devices, and the plurality of receiving devices each having at least one of antennas and receiving the radio signals transmitted from the transmitting device, each of the plurality of receiving device comprising:
an extraction unit to extract, from the received radio signals, transmission characteristic information containing transmission path information corresponding to an environment where the radio signals are transmitted and containing elements corresponding to the numbers of antennas that each of the plurality of receiving devices has; and
an information transmitting unit to transmit, to the transmitting device, configuring information including the number of the antennas regarding each of the plurality of receiving devices and the transmission characteristic information, the transmitting device comprising:
a detection unit to detect the configuration information and the transmission characteristic information from signals received from the plurality of receiving devices;
a transforming unit to obtain transmission path information indicative of a transmission path characteristic between the plurality of antennas of the transmitting device and all of the antennas of the plurality of receiving devices from the detected transmission characteristic information, to obtain a change-of-variable matrix from the obtained transmission path information and the number of the antennas regarding each of the plurality of receiving devices included in the detected configuration information and to transform respective transmission data by multiplying the respective transmission data by the obtained change-of-variable matrix;
a separating unit to allocate the respective transmission data transformed by the transforming unit to each other's different antenna of the plurality of antennas; and
a plurality of transmitting unit configured to correspond with the plurality of antennas to transmit respective radio signals corresponding to the respective transmission data allocated by the separating unit, wherein the transforming unit holds the used change-of-variable matrix that was used in a previous transforming, detects the latest transmission path information from the detected transmission characteristic information and the used change-of-variable matrix, obtains the latest change-of-variable matrix from the latest transmission path information and the detected transmission characteristic information and transform the respective transmission data by multiplying the respective transmission data by the latest change-of-variable matrix.

2. The wireless communication system according to claim 1, wherein the configuration information contains information indicating a demodulation method executed by each of the plurality of receiving devices, and the transforming unit obtains the change-of-variable matrix from the obtained transmission path information, the number of the antennas regarding each of the plurality of receiving devices, and the information indicating the demodulation method.

3. The wireless communication system according to claim 1, the transmitting device further comprising
a transmission rate control unit to control a transmission rate of the transmission data based on the detected configuration information and the obtained transmission path information.

4. The wireless communication system according to claim 3, wherein the configuration information contains information indicating a data identifying method executed by each of the plurality of receiving devices, and the transmission rate control unit controls the transmission rate of the transmission data based on the detected configuration information, the obtained transmission path information and the information indicating the data identifying method.

5. A transmitting device communicating with a plurality of receiving devices at the same time, comprising:
   a plurality of antennas;
   an acquisition unit to acquire configuration information including the number of the antennas regarding each of the plurality of receiving devices and transmission characteristic information that are extracted from received radio signals by the plurality of receiving devices and are transmitted from the plurality of receiving devices;
   a transforming unit to obtain transmission path information indicative of a transmission path characteristic between the plurality of antennas of the transmitting device and all antennas of the plurality of receiving devices from the acquired transmission characteristic information, to obtain a change-of-variable matrix from the obtained transmission path information and the number of the antennas regarding each of the plurality of receiving devices included in the acquired configuration information and to transform respective transmission data by multiplying the respective transmission data by the obtained change-of-variable matrix;
   a separating unit to allocate the respective transmission data transformed by the transforming unit to each other's different antenna of the plurality of antennas: and
   a plurality of transmitting unit configured to correspond with the plurality of antennas to transmit respective radio signals corresponding to the respective transmission data allocated by the separating unit,
   wherein the transforming unit holds the used change-of-variable matrix that was used in a previous transforming, detects the latest transmission path information from the acquired transmission characteristic information and the used change-of-variable matrix, obtains the latest change-of-variable matrix from the latest transmission path information and the acquired transmission characteristic information and transforms the respective transmission data by multiplying the respective transmission data by the latest change-of-variable matrix.

6. The transmitting device according to claim 5, further comprising
   a transmission rate control unit to control a transmission rate of the transmission data based on the acquired configuration information and the obtained transmission path information.

* * * * *